United States Patent [19]
Smith, Jr.

[11] 4,412,421
[45] Nov. 1, 1983

[54] ENGINE OPERATED BY A NON-POLLUTING RECYCLABLE FUEL

[75] Inventor: E. Quimby Smith, Jr., Graeagle, Calif.

[73] Assignee: Q Corporation, Troy, Mich.

[21] Appl. No.: 230,798

[22] Filed: Feb. 2, 1981

Related U.S. Application Data

[63] Continuation-in-part of Ser. No. 937,553, Sep. 1, 1978, Pat. No. 4,248,048, which is a continuation-in-part of Ser. No. 671,280, Mar. 29, 1976, Pat. No. 4,129,003.

[51] Int. Cl.³ .............................................. F02G 1/04
[52] U.S. Cl. ...................................... 60/643; 60/645; 60/517; 122/4 D
[58] Field of Search ................. 60/516, 517, 643, 645; 122/4 D; 110/245

[56] References Cited

U.S. PATENT DOCUMENTS

| 4,085,593 | 4/1978 | Larsen | 122/4 D |
| 4,223,529 | 9/1980 | Willyoung | 122/4 D |

FOREIGN PATENT DOCUMENTS

50-59273  5/1975  Japan .................................. 122/4 D

Primary Examiner—Allen M. Ostrager
Attorney, Agent, or Firm—Barnes, Kisselle, Raisch, Choate, Whittemore & Hulbert

[57] ABSTRACT

There is disclosed the utilization of a fluidized bed as a combustion chamber for the combustion in an external combustion engine of the recyclable fuels magnesium, aluminum, and their hydrides and/or alloys. The combustion products serve in whole or in part as the inert media for the bed.

11 Claims, 5 Drawing Figures

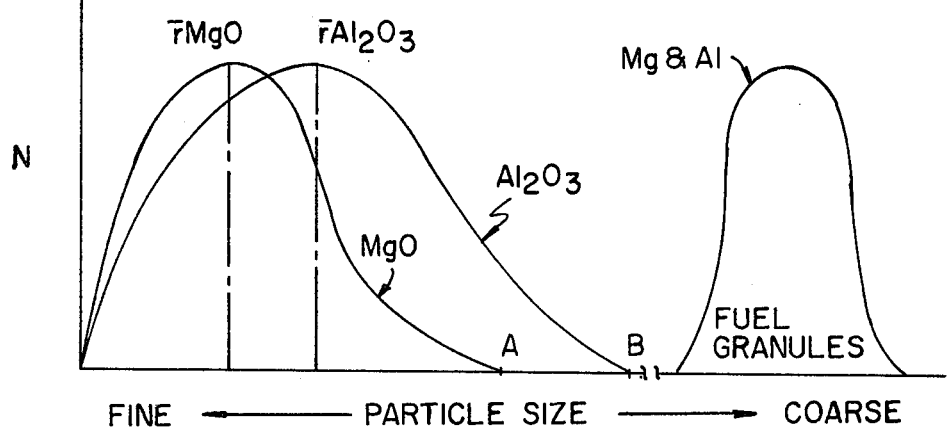
FIG. 1
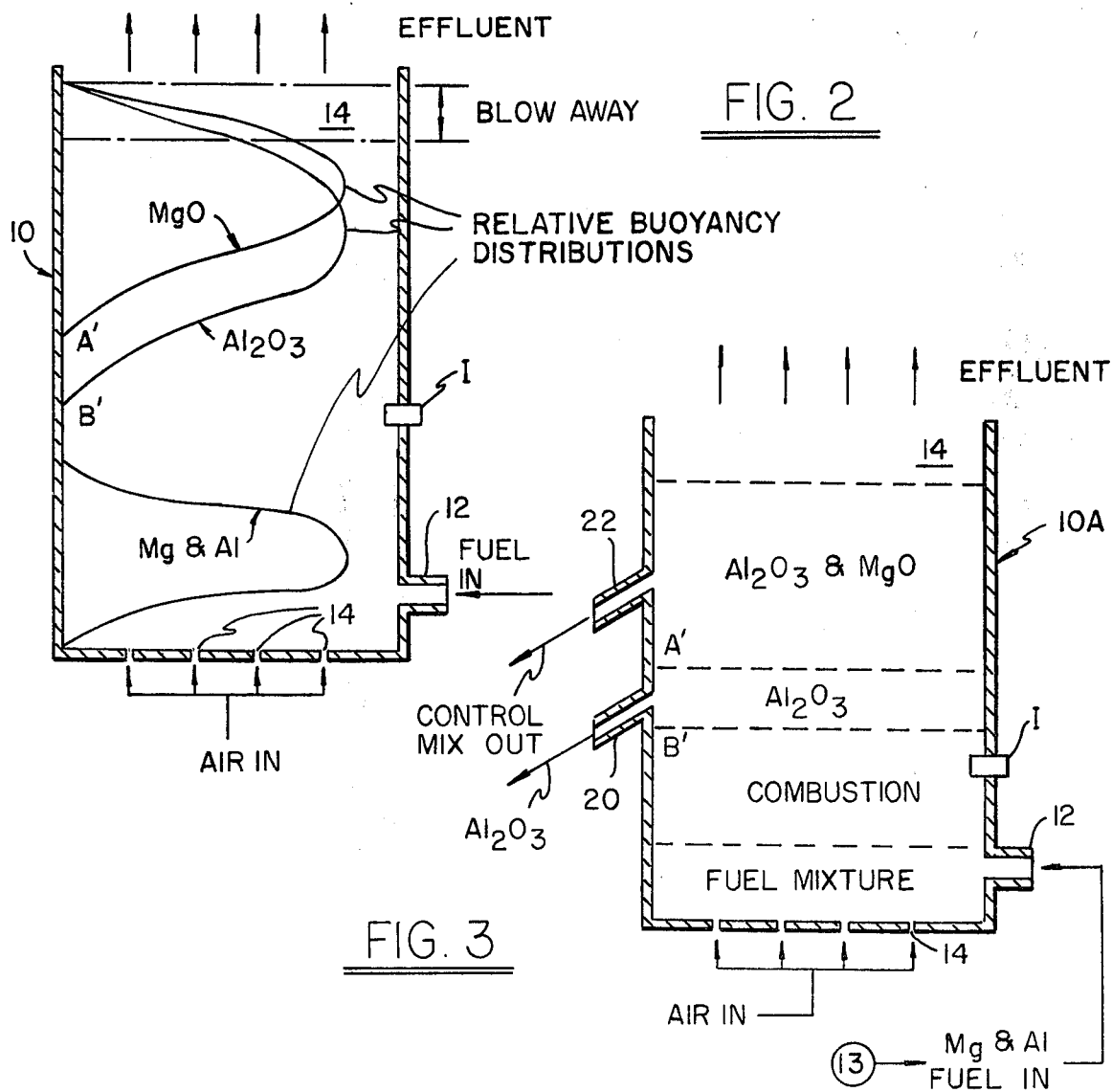
FIG. 2
FIG. 3

ENGINE OPERATED BY A NON-POLLUTING RECYCLABLE FUEL

REFERENCE TO RELATED APPLICATIONS

This application is a continuation-in-part of my copending application, Ser. No. 937,553 filed Sept. 1, 1978 now U.S. Pat. No. 4,248,048 which in turn is a continuation-in-part of my prior application, Ser. No. 671,280 filed Mar. 29, 1976, now U.S. Pat. No. 4,129,003.

This invention relates generally to external combustion engines operated with solid fuels, and refers more particularly to the utilization of a fluidized bed combustion process for such engines.

BACKGROUND AND SUMMARY OF THE INVENTION

Efficiency of external combustion engines in a thermo-dynamic sense is a function of the difference between the rejection temperature to ambient and the maximum operating temperature. The magnesium/aluminum fuels and their hydrides, which are discussed in my prior patent and patent application identified above, can provide significantly higher maximum temperatures, and thus greater thermodynamic efficiencies. Materials and design of equipment generally determine the upper efficiency limit; for this reason I have invented a new and unique principle, which allows for higher operating temperatures, and satisfies my earlier requirement for collection and recycling of products of combustion, as well as the non-polluting aspects. The concept of a fluidized bed combustion process is introduced here to control and improve the combustion and to improve the overall heat transfer. A unique optional feature herein, is that the products of combustion (i.e. particles of various sizes, capable of withstanding high temperatures) themselves may be used at least in part to form a natural fluidized bed of solid particles to assist in the heat transfer. Combustible solids would be continuously introduced and excess products of combustion drawn off. In addition, the system could provide for preliminary partial separation of chemically different particles to aid in the recycling process.

Fluidized beds are old in the art and are designed on the principle of an upward vertical column of air flowing through a bed of solid particles, wherein the upward vertical velocity of air is sufficient to create an upward drag (lift) force on the particle which is approximately equal to the downward force of gravity on the particle. When this occurs the bed is said to be incipiently fluidized and the solid-gas mixture behaves to a large extent like a liquid. This results in high rates of heat transfer throughout the bed, high rates of solids mixing and of solids transport to and from the bed, reduction of temperature gradients due to a high degree of solids mixing, and high values of thermal inertia of the solids. Often the fluidized bed is precharged for a given function and recharged periodically, but the advantages of a continuous operation make this mode most desireable. Numerous technical papers are in the published literature on this subject so further expansion is not necessary.

The basis of the invention claimed herein is to utilize a fluidized bed as a combustion chamber for the combustion in an external combustion engine of the recyclable fuels magnesium, aluminum, their hydrides and/or alloys, and thereby capitalize on the thermodynamic advantages listed above. At the same time, excessively high flame temperatures can be reduced and controlled while still affording the higher efficiencies available at the generally elevated temperatures which exist within the combustion bed. These elevated temperatures would be limited in the practical case by materials, or by the working fluids. Fluidized beds generally utilize larger granules of an inert compound, such as silicon to promote mixing and control the fluid dynamics. Many higher temperature inert compounds, such as silicon carbide or titanium carbide, are available and contemplated for use with the elevated temperatures of the combustion process herein described.

A unique part of this invention, which advances the state of the art, is the use of the combustion products themselves in whole or in part as the inert media for the bed. It should be pointed out that the combustion products of the recyclable fuel basically will be magnesium oxide and aluminum oxide, and that these chemical compounds are often used as fire brick or furnace liners where high temperatures are involved; therefore, they become desireable as inert particle solids for the bed in the combustion process.

Further, it should be pointed out that while the flame temperatures of magnesium and aluminum are very high, the air to fuel ratios necessary for complete combustion are such that the particles will be immediately cooled from the gaseous (combustion) state and become solids while still in the fluidized bed; the reason being that when air is used to furnish the oxygen for combustion, an air to fuel ratio in excess of stoichiometric conditions is required for complete (efficient) combustion. This air to fuel ratio will typically yield gas flow temperatures considerably less than the flame temperatures. For example, with an air to fuel ratio of 20 to 1 (vice about 3.5 to 1 for stoichiometric conditions) for a magnesium-aluminum mixture, the flow temperature will be reduced to about 2400° F. compared to the flame temperatures of aluminum (3700° F.) and magnesium (5000° F.). Higher temperatures may be obtained by either lowering the air to fuel ratio, or by introducing additional oxygen in a supplemental manner, such as introducing ammonia-perchlorate or potassium-perchlorate, into the combustion area. In this manner, gas flow temperatures greater than 2400° F. may be obtained. Flow temperatures may be increased at least to 3700° F., which is the melting point of $Al_2O_3$. At this point and above, liquid aluminum oxide will exist within the bed. Although the introduction of a liquid state into the fluidized bed is not necessarily detrimental, it may complicate the mass transfer and thus become an "effective" maximum operating temperature. If however, liquids can be effectively accommodated in the solid-liquid-gas mixture, then the actual upper bound operating temperature would be about 5400° F., the boiling (condensation) point for $Al_2O_3$, the point at which capture of the gaseous products of combustion is no longer easily controlled.

The reason for this teaching is to establish an upper temperature limit on the fluidized bed, in keeping with the goal of maximum thermodynamic efficiency. As the container (crucible) for the fluidized bed may be constructed of ceramics, it must be capable of withstanding temperatures greater than 3700° F.

I should also mention that, in my earlier patent and patent application on this subject, one of the preferred methods of transferring the heat of combustion to the working fluid of the engine was via sodium heat pipes. The phase change temperature of sodium, i.e., liquid to gas, would thus introduce another upper limit on the efficiency of the engine. Since there are other chemicals, such as lithium, with a higher phase change temperature, i.e., 2,418° F., a chemical, such as this, may be used in the heat pipe and thus, lead to an increase in engine efficiency.

As a final point of background; when the fuel is combusted and heat extracted to perform useful work, the solid particles formed will be of various sizes, and hence assume a vertical distribution which is a function of their size. MgO and $Al_2O_3$ particles of identical radius, however, will have different gravity forces, due to chemical composition, but identical drag forces.

BRIEF DESCRIPTION OF THE DRAWINGS

FIG. 1 is a diagram showing the particle size distributions for the fuel and the combination products in the fluidized bed of FIG. 2.

FIG. 2 is a diagrammatic view of a fluidized bed combustion chamber suitable for use in the external combustion engine system of FIG. 4, showing vertical particle distribution.

FIG. 3 is a diagrammatic view of a fluidized bed combustion chamber of modified construction suitable for use and generally of the type shown in the external combustion engine system of FIG. 4.

DESCRIPTION OF THE PREFERRED EMBODIMENT

Referring now more particularly to the drawings, my invention involves the operation of an engine such as a Stirling engine on a fuel which is selected from the group consisting of solid particles of magnesium, aluminum, magnesium plus aluminum, magnesium-aluminum alloy, magnesium hydride, aluminum hydride and magnesium aluminum hydride. In other words, the fuel may include any one or more of the materials in the group. The solid products of combustion resulting from the operation of the engine using all these fuels would be magnesium oxide (MgO), aluminum oxide ($Al_2O_3$), magnesium hydroxide ($Mg(OH)_2$) and aluminum hydroxide ($Al(OH)_3$). The products of combustion are collected and taken to a conversion facility for recycling. At the conversion facility, the oxides and hydroxides of magnesium and aluminum are reduced to magnesium and aluminum and their hydrides which are thereafter reformed to produce fuel that may again be used to operate the engine. This is described more fully in my patent and patent application above-identified, the disclosures of which are incorporated herein by reference.

Figure 4:
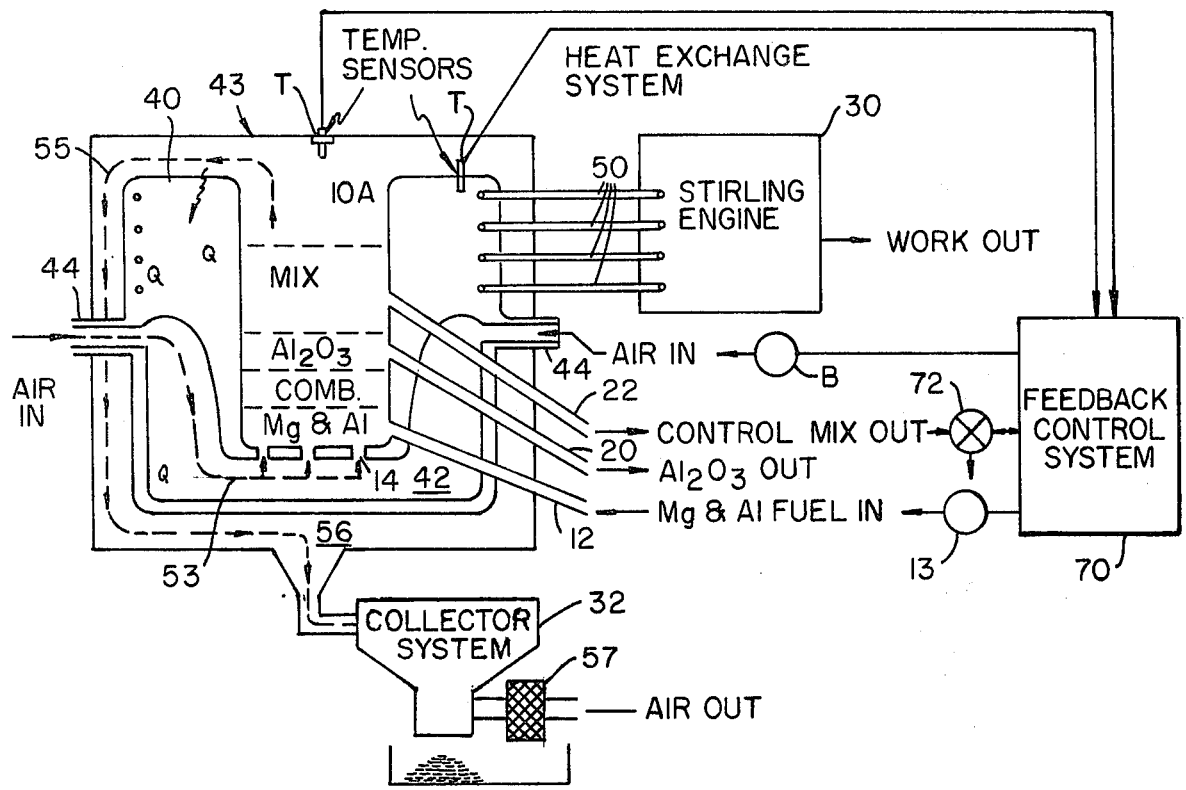
FIG. 4 is a diagrammatic view in section of an external combustion engine utilizing a fluidized bed combustion process in accordance with my invention.

FIG. 1 shows the particle size distribution for the burning fuel, in this case aluminum and magnesium, and also for the combustion products, which are aluminum oxide ($Al_2O_3$) and magnesium oxide (MgO) when the fuels are aluminum and magnesium, in the fluidized bed maintained within a combustion chamber of the type shown in FIG. 2 employed to drive the external combustion engine 30 (Stirling engine) of FIG. 4.

The ordinate N in FIG. 1 represents normalized distribution, that is the number of particle occurrences, and the abscissa represents particle size. Curves for the fuel mixture of aluminum and magnesium designated Al and Mg, respectively, and for the products of combustion aluminum oxide and magnesium oxide designated $Al_2O_3$ and MgO, respectively, are shown. Since the aluminum oxide particles differ from the magnesium oxide particles in size and in their affinity to agglomerate, two different distribution curves exist. The terms $\bar{r}$ MgO and $\bar{r}$ $Al_2O_3$ define some mean radius for the products of combustion, and the points A and B indicate the largest-sized particles for the two oxides. Note that if a magnesium or aluminum hydride is used as a fuel, the products of combustion will contain a magnesium or aluminum hydroxide in addition to the pure oxides mentioned above, but the principles discussed herein are still valid. The discussion and figures herein are limited to the pure oxides for clarity. While the zero point shows both compounds going to a zero radius, it will be appreciated that the minimum radii will be finite and that $Al_2O_3$ being a more complex compound than MgO, will have the greater minimum radius and a greater density. This difference is of no particular practical value, however, since both molecular-level particles are extremely light and would undoubtedly either not exist without agglomeration, or would certainly be lifted out in the effluent stream.

In FIG. 2, there is shown diagrammatically a cylindrical combustor or combustion chamber 10 in which the ordinate and abscissa of FIG. 1 have been rotated 90° clockwise to characterize a steady state distribution of the fuel mixture of aluminum and magnesium and their oxides existing during combustion in the fluidized bed within the combustion chamber. As shown, the larger particles of fuel are distributed according to particle size as indicated by the distribution curve near the bottom of the combustion chamber, and the oxide products of combustion are distributed according to particle size as indicated by their respective curves in an upper region of the combustion chamber. The reference number 12 designates an inlet for fuel to the combustion chamber, and ports 14 in the bottom of the combustion chamber admit air introduced under pressure to establish the fluidized bed condition of the particles being burned. Igniter I ignites the fuel.

The vertical distribution of particles in combustion chamber 10 is based on particle "relative buoyancy" or, specifically, on the difference between its weight and its lift forces within the bed. Thus, at any given height within the bed, all the particles of MgO will have a common radius, and all the particles of $Al_2O_3$ will have another common radius different from the MgO. The relationship between these two radii can be shown to be inversely proportional to the molecular density ratio which is, of course, known.

An indicated portion of the upper particle distribution in the zone 15 of the combustion chamber 10 (extremely small particles of both oxides) will inevitably be carried away in the effluent (depending on flow velocity and bed characteristics) as fly-ash and will be collected down stream by some appropriate filtering means as more fully described hereinafter in connection with FIG. 4.

From the foregoing it should be apparent that if the oxides tend to agglomerate dissimilarly such that points A' and B' are not coincidental, then the region between points A' and B' might contain only a single oxide ($Al_2O_3$ in the case shown in FIG. 2) which could then be drawn off or tapped. The intermediate region above point A' will contain a mixture of the compounds. As the combustion process proceeds, regulated amounts of this mixture will be drawn off or tapped to maintain a control on the operating mass within the fluidized bed combustor. This intermediate mixture may be called the control mix.

FIG. 3 is a diagrammatic view of a combustion chamber 10A which is like that of FIG. 2 but shows the addition of two taps 20 and 22. Tap 20 is for drawing off the separated oxide (e.g. $Al_2O_3$) between points A' and B' and tap 22 is for drawing off the control mix ($Al_2O_3$ and MgO) above point A' to thereby maintain a stabilized bed as additional fuel solids are continually added to the bed through the inlet 12 by fuel feeder 13 and solids of combustion are generated. The combustion zone is immediately above the admitted fuel mixture. In the event that points A' and B' actually do coincide, then only a single tap would be used and effect no change in the process.

Figure 5:
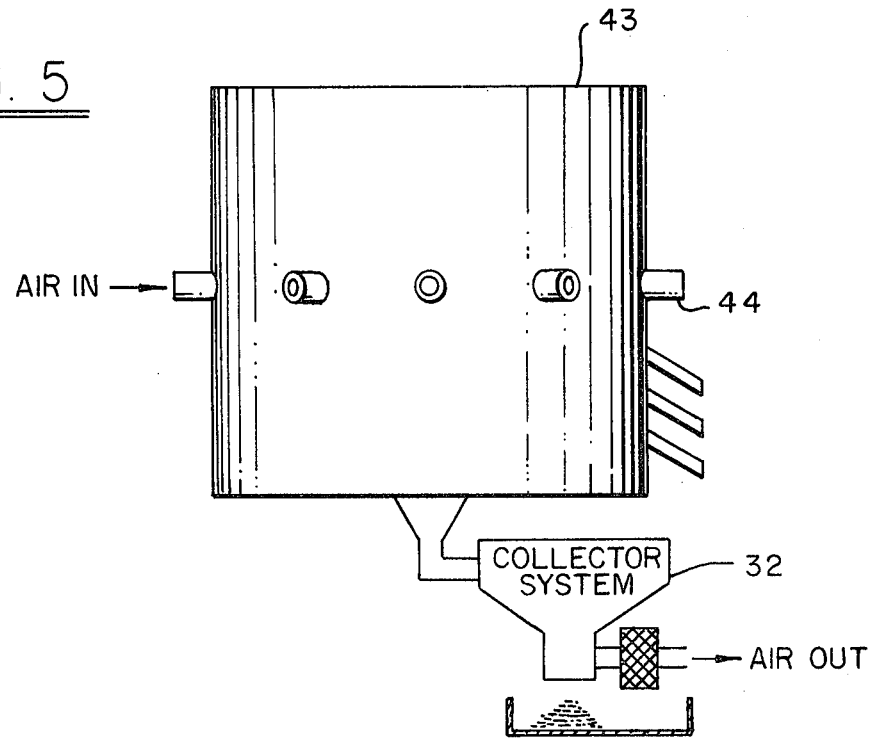
FIG. 5 is an elevational view of a portion of FIG. 4.

FIGS. 4 and 5 show diagrammatically a complete system including a heat exchange system 50, an external combustion engine 30 (Stirling engine) and a collector system 32, and indicates the direction of typical heat flow by wavy arrows Q. It will be understood that the engine 30 and collector system 32 may be of the type shown and described in my prior patent and patent application.

The combustion chamber in FIG. 4 is designated 10A and it is essentially like that of FIG. 3. It is formed in a crucible 40 of ceramic material which has an air intake plenum 42 beneath and surrounding the lower portion of the combustion chamber 10A. It is disposed in a housing 43. Air enters the bed through ports 14 in the bottom. A suitable blower B supplies air under pressure to the bed through ports 44 for fluidization and to overcome pressure losses through the plenum and collection systems. Although not shown, a manifold may be provided between the blower B and the several ports 44. Taps 20 and 22 are for drawing off the separated oxide and the control mix and inlet 12 is for admitting solid particles of fuel fed by feeder 13. A stable fluidized bed is maintained in the combustion chamber 10A by continuous controlled tapping and fuel feeding. In FIG. 4, the fuel consists of aluminum and magnesium. The combustion products are aluminum oxide and a control mix of aluminum oxide and magnesium oxide. An igniter serves to ignite the fuel.

The working fluid of the engine flows through the heat pipes 50, as more fully described in my prior patent and patent application. Heat pipes 50 are embedded in the thick wall of the crucible surrounding the combustion chamber 10A, thereby avoiding errosive effects of the flow and providing a thermal lag (smoothing) function for the heat transfer during intermittent operation. The heated working fluid flows to the expansion spaces in the engine to drive the same, as described more fully in my prior patent and patent application.

The intake air shown by arrows 53 in the plenum 42 is preheated by radiation from both the crucible 10A and the hot gases 55 in the exhaust plenum 56. The hot effluent shown by arrows 55 also continues to heat the crucible. The effluent flows from the bed through the exhaust plenum 56 to a collector system and a filter 57 which may be required to remove fly-away oxides before returning the air to the atmosphere.

A feedback control system 70 is provided to automatically and continuously adjust the fuel feed rate and air flow rate to maintain a given air-to-fuel ratio and combustion chamber temperature. As shown in FIG. 4, temperature sensors T continuously monitor the combustion chamber temperature and the crucible temperature in the vicinity of the heat exchange systems (heat pipes 50) and feed the monitored information to the feedback control system 70. The amount of flow of control mix out is monitored at 72, such information also being fed to the control system 70 which controls the operation of the blower B and fuel feeder 13.

The solid combustion products themselves serve as an inert media for the bed. It will be understood that if desired other inert material such as solid particles of silicon, silicon carbide or titanium carbide may be added to the bed to promote mixing and control the fluid dynamics. Also, an oxygen-containing compound such as ammonia-perchlorate or potassium-perchlorate may be fed into the combustion chamber, along with the fuel through inlet 12 if desired, to provide supplemental oxygen for combustion.

It will be appreciated that the design shown in FIG. 4 is only one of many feasible configurations and that adaptation may require specific design constraints, such as embedding the suitably protected heat pipes within the fluidized media itself. It should also be stated that while a cylindrical fluid bed configuration is shown, various other forms, such as conical, are feasible and will depend, to an extent, on where the heat is withdrawn as this will effect the stream velocity, which is a dominant parameter in maintaining the stability conditions required for a fluidized bed. All the heat transfer surfaces in the intake plenum may have radiator fins to improve heat transfer from the outside of the crucible walls to preheat the incoming air. The exhaust plenum shape, similarly, may be designed to maximize the heat transferred first to the crucible mass and later to the incoming air plenum 42. The design shown is, however, free of any possible errosive effects on the heat pipes.

I claim:

1. A system of operating an external combustion engine which is operated by a heated working fluid of the engine, comprising providing solid partcles of fuel selected from the group consisting of magnesium, aluminum, magnesium plus aluminum, magnesium-aluminum alloy, magnesium hydride, aluminum hydride and magnesium aluminum hydride, providing a combustion chamber in association with the engine, feeding said solid particles of fuel into said combustion chamber, establishing a fluidized bed of solid particles in said combustion chamber by introducing a flow of air and burning said fuel particles in the presence of the air, and heating the working fluid of the engine by the heat of the burning fuel.

2. A system as defined in claim 1, including operating and maintaining said fluidized bed on a controlled basis.

3. A system as defined in claim 1, including introducing said fuel particles to said combustion chamber and withdrawing products of combustion from said combustion chamber on a controlled basis.

4. A system as defined in claim 1, including introducing said fuel particles and flow of air to said combustion chamber at rates controlled by an automatic system sensitive to combustion chamber temperature.

5. A system as defined in claim 1, including introducing said fuel particles and flow of air to said combustion chamber at rates controlled by an automatic system sensitive to air-to-fuel ratio.

6. A system as defined in claim 1, wherein the natural products of combustion comprise at least a part of the inert media of the fluidized bed.

7. A system as defined in claim 1, including introducing an oxygen-containing compound into said combustion chamber to provide supplemental oxygen for combustion.

8. A system as defined in claim 1, wherein the working fluid of the engine is subjected to the heat generated in the combustion chamber through heat transfer means.

9. A system as defined in claim 8, wherein said heat transfer means comprise heat pipes.

10. A system as defined in claim 1, including separating the solid oxides and/or hydroxides resulting from the burned fuel and collecting the same, and reducing said oxides and/or hydroxides and reprocessing the reduction products for reuse.

11. A system as defined in claim 1, including withdrawing products of combustion from said combustion chamber, and introducing fuel particles and flow of air to said combustion chamber at rates controlled by an automatic system sensitive to the amount of products of combustion withdrawn from said combustion chamber.

* * * * *